United States Patent
Li et al.

(10) Patent No.: US 11,447,691 B1
(45) Date of Patent: Sep. 20, 2022

(54) METHODS OF MAKING AND USING A WELLBORE SERVICING FLUID FOR IRON MITIGATION

(71) Applicant: Halliburton Energy Services, Inc., Houston, TX (US)

(72) Inventors: Leiming Li, Houston, TX (US); Philippe Prince, Houston, TX (US); Loan Vo, Houston, TX (US); Liang Xu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/386,875

(22) Filed: Jul. 28, 2021

(51) Int. Cl.
*C09K 8/68* (2006.01)
*E21B 43/267* (2006.01)
(Continued)

(52) U.S. Cl.
CPC ............... *C09K 8/68* (2013.01); *C09K 8/80* (2013.01); *E21B 43/267* (2013.01); *C09K 2208/28* (2013.01)

(58) Field of Classification Search
CPC ........ E21B 43/26; E21B 43/267; E21B 43/25; E21B 43/16
See application file for complete search history.

(56) References Cited

U.S. PATENT DOCUMENTS

| | | |
|---|---|---|
| 9,676,706 B2 | 6/2017 | Recio, III et al. |
| 2009/0023613 A1 | 1/2009 | Li et al. |

(Continued)

FOREIGN PATENT DOCUMENTS

| | | |
|---|---|---|
| WO | 2016060685 A1 | 4/2016 |
| WO | 2016140657 A1 | 9/2016 |

(Continued)

OTHER PUBLICATIONS

Electronic Filing Receipt, Specification and Drawings for International Application No. PCT/US2021/043539, entitled "Methods of Making and Using Wellbore Servicing Fluid for Iron Mitigation," filed Jul. 28, 2021, 52 pages.

(Continued)

*Primary Examiner* — Zakiya W Bates
(74) *Attorney, Agent, or Firm* — Conley Rose, P.C.; Rodney B. Carroll

(57) ABSTRACT

A method of servicing a wellbore penetrating at least a portion of a subterranean formation, including placing into the wellbore a wellbore servicing fluid including a friction reducer, an iron control agent, and an aqueous fluid. The iron control agent can include a compound according to Structure I, a salt of Structure I, or combinations thereof:

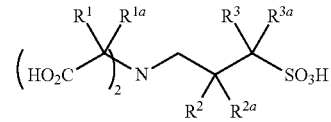

wherein $R^1$, $R^{1a}$, $R^2$, $R^{2a}$, $R^3$ and $R^{3a}$ are defined as set forth in the specification. The methods in this disclosure can be used for iron mitigation.

20 Claims, 4 Drawing Sheets

(51) Int. Cl.
*C09K 8/80* (2006.01)
*E21B 43/22* (2006.01)

(56) References Cited

U.S. PATENT DOCUMENTS

| | | |
|---|---|---|
| 2013/0213657 A1 | 8/2013 | Dobson, Jr. et al. |
| 2014/0251624 A1 | 9/2014 | Gupta et al. |
| 2016/0075942 A1 | 3/2016 | Li et al. |
| 2017/0145303 A1 | 5/2017 | Fontenelle et al. |
| 2018/0016486 A1 | 1/2018 | German Borgogno |
| 2019/0153303 A1 | 5/2019 | Riley et al. |
| 2019/0211256 A1 | 7/2019 | Recio, III et al. |
| 2021/0079291 A1 | 3/2021 | Li et al. |
| 2021/0080439 A1 | 3/2021 | Li et al. |

FOREIGN PATENT DOCUMENTS

| | | |
|---|---|---|
| WO | 2017187150 A1 | 2/2017 |
| WO | 2021055017 A1 | 3/2021 |
| WO | 2021055018 A1 | 3/2021 |

OTHER PUBLICATIONS

Foreign Communication from Related Application—International Search Report and Written Opinion of the International Searching Authority, International Application No. PCT/US2020/028072, dated Jul. 31, 2020, 12 pages.

Foreign Communication from Related Application—International Search Report and Written Opinion of the International Searching Authority, International Application No. PCT/US2020/028076, dated Jul. 31, 2020, 12 pages.

Foreign Communication from Related Application—International Search Report and Written Opinion of the International Searching Authority, International Application No. PCT/US2021/043539, dated Apr. 18, 2022, 10 pages.

Schneppensieper, T. et al., "Tuning the reversible binding of NO to Iron(II) aminocarboxylate and related complexes in aqueous solution", European Journal Inorganic Chemistry, 2001, vol. 2001, pp. 491-501, Wiley-VCH Verlag GmbH.

METHODS OF MAKING AND USING A WELLBORE SERVICING FLUID FOR IRON MITIGATION

BACKGROUND

This disclosure relates generally to methods of servicing a wellbore. More specifically, it relates to methods of treating a wellbore penetrating a subterranean formation, for example during a fracturing operation.

Hydrocarbons, such as oil and gas, are often produced from wells that penetrate hydrocarbon-bearing subterranean formations or portions thereof. Hydrocarbon-producing wells may be stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore may be increased, enhancing hydrocarbon recovery rates.

An important component of hydraulic fracturing fluids is a friction reducer. However, friction reducer performance can be damaged by some ions such as Fe ions, Ca ions, or Mg ions in water (e.g., water available to mix the fracturing fluid at a well site) and formation brine. The damaging ions may associate with friction reducer molecules and form precipitates, also referred to as "gummy bears", preventing the polymer chain from effectively elongating which may reduce friction reduction efficiency, and cause stimulation equipment damage. These gummy bears may compromise the optimal functionality of stimulation equipment, for example, by decreasing the friction reducing capacity to various degrees, or causing damage to stimulation equipment. Additionally, these gummy bears may be formed in downhole conditions and cause formation damage. These gummy bears may intrude into the formation pores or fractures, resulting in damage to the formation or a reduction in formation conductivity. These gummy bears may also be produced from wells during production operations and may damage production or separation equipment.

Therefore, an ongoing need exists for a wellbore servicing fluid that can mitigate precipitates formed from friction reducers associating with cations.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a method of servicing a wellbore penetrating at least a portion of a subterranean formation (also referred to as a formation hereinafter) with a wellbore servicing fluid. In aspects, the method includes placing a wellbore servicing fluid into the wellbore. The wellbore servicing fluid can be a fracturing fluid (e.g., a slickwater). In one or more aspects, the wellbore servicing fluid includes a friction reducer, an iron control agent, and an aqueous fluid.

Figure 1:
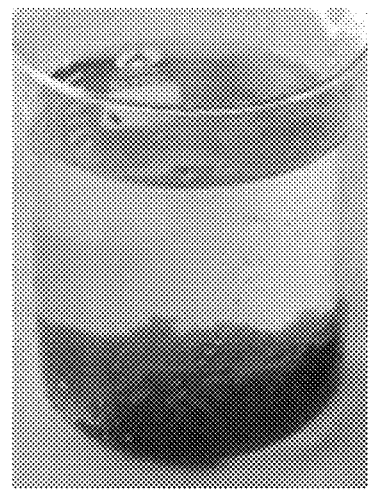
FIG. 1 is a photograph of an oilfield fluid sample containing precipitates of friction reducers.

The present disclosure relates to subterranean operations, and, in one or more implementations, to preventing dissolved species (e.g., cationic species) from interfering with friction reducers such as anionic friction reducers. Friction reducers such as a friction reducing polymer may be damaged by dissolved species such as iron ions in water (e.g., formulation water, formation brine). The species dissolved in the water may form associations with the friction reducing polymer reducing solubility of the friction reducing polymer and leading to precipitates of friction reducing polymer. These precipitates may reduce conductivity of the formation or the proppant pack. The precipitates can be formed on the surface of a wellsite during preparation of a treatment fluid. Formation of precipitated friction reducers can occur even in a downhole environment. These precipitates may decrease the efficiency of friction reduction provided by these compounds resulting in stimulation equipment damage and formation damage. FIG. 1 shows an example of a fluid sample from oil field containing precipitated friction reducer or the so-called gummy bears recovered from a fracturing operation.

Formation of precipitated friction reducing polymers may be driven by physicochemical properties of water including, but not limited to, concentration of soluble ions in water, chemical identity of friction reducer, and water pH, for example.

In one or more aspects, the wellbore servicing fluid includes an iron control agent. The iron control agent can include a compound according to Structure I, a salt of Structure I, or combinations thereof:

Structure I:

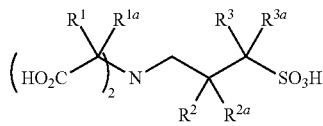

wherein $R^1$, $R^{1a}$, $R^2$, $R^{2a}$, $R^3$ and $R^{3a}$ are independently selected from a group including H, —OH, halo, straight or branched ($C_1$-$C_6$)alkyl, straight or branched ($C_2$-$C_6$)alkenyl, straight or branched ($C_2$-$C_6$)alkynyl, ($C_3$-$C_{14}$)aryl, ($C_3$-$C_{14}$)-cycloalkyl, ($C_3$-$C_{14}$)aryl($C_1$-$C_6$)alkylene-, ($C_3$-$C_{14}$)heteroaryl-($C_1$-$C_6$)alkylene-, ($C_3$-$C_{14}$)heteroaryl, ($C_3$-$C_{14}$)heterocycloalkyl, ($C_3$-$C_{14}$)heterocycloalkyl-($C_1$-$C_6$)alkylene-, ($C_3$-$C_{14}$)heteroaryl-($C_3$-$C_6$)heterocycloalkylene-, ($C_3$-$C_{14}$)aryl-($C_3$-$C_{14}$)heterocycloalkylene-, ($C_3$-$C_{14}$)-aryl-($C_1$-$C_6$)alkyl-($C_3$-$C_{14}$)heterocycloalkylene-, ($C_3$-$C_{14}$)heteroaryl-($C_1$-$C_6$)alkyl-($C_3$-$C_{14}$)heterocycloalkylene-, ($C_3$-$C_{14}$)heterocycloalkyl-($C_1$-$C_6$)alkyl-($C_3$-$C_{14}$)heterocycloalkylene-.

The iron control agent can include a sulfonated iminodialkanoic acid (such as sulfonated iminodiacetic acids), a related salt, or combinations thereof. As used herein, the term "sulfonated" refers to the condition of a compound bearing a sulfonic acid group. Due to the presence of the acidic sulfonic acid group, sulfonated iminodialkanoic acids can maintain high solubility levels and low pH values in aqueous fluids, such as in aqueous acidizing fluids. The related salt refers to a salt of the sulfonated iminodialkanoic acid. In one or more aspects, the iron control agent includes N,N-diacetylhomotaurine.

In one or more aspects, the iron control agent is present in the wellbore servicing fluid in an amount of from about 5.0E-2 mmol/L to about 100 mmol/L, alternatively from about 5.0E-2 mmol/L to about 20 mmol/L, or alternatively from about 5.0E-2 mmol/L to about 3 mmol/L based on the total volume of the wellbore servicing fluid.

A friction reducer can be included in the wellbore servicing fluid, for example, to form a fracturing fluid or a slickwater fluid. In one or more aspects, the friction reducer includes an anionic friction reducer, a cationic friction reducer, a nonionic friction reducer, an amphoteric friction reducer, or a combination thereof. The friction reducer can include a friction reducing polymer, which can be a polysaccharide or a synthetic polymer.

One example of a suitable friction reducing polymer is a polymer including acrylamide and acrylic acid and related salts or esters. The acrylamide and acrylic acid may be present in the polymer in any suitable concentration. An example of a suitable polymer may include acrylamide in an amount in the range of from about 5% to about 95% by weight and acrylic acid in an amount in the range of from about 5% to about 95% by weight. Another example of a suitable polymer may include acrylamide in an amount in the range of from about 60% to about 90% by weight and acrylic acid in an amount in the range of from about 10% to about 40% by weight. Another example of a suitable polymer may include acrylamide in an amount in the range of from about 80% to about 90% by weight and acrylic acid in an amount in the range of from about 10% to about 20% by weight. Yet another example of a suitable polymer may include acrylamide in an amount of about 85% by weight and acrylic acid in an amount of about 15% by weight. As previously mentioned, one or more additional monomers may be included in the polymer including acrylamide and acrylic acid. By way of example, the additional monomer(s) may be present in the friction reducing polymer in an amount up to about 20% by weight of the polymer.

Friction reducers suitable for use in the present disclosure may be in an acid form or in a salt form. As will be appreciated by one of ordinary skill in the art, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the wellbore servicing fluid. The term "polymer" in the context of a friction reducer, may be intended to refer to the acid form of the friction reducer, as well as its various salts.

In one or more aspects, the friction reducer includes a polyacrylamide, a polyacrylamide derivative, a synthetic polymer, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, polymers synthesized from one or more monomeric units selected from the group including acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, their corresponding salts, and their corresponding esters, or combinations thereof.

The friction reducer can be present in the wellbore servicing fluid in an amount of from about 0.0001 wt. % to about 3 wt. %, alternatively from about 0.001 wt. % to about 3 wt. %, or alternatively from about 0.025 wt. % to about 1 wt. % based on a total weight of the wellbore servicing fluid.

The friction reducer can be included in the wellbore servicing fluid in the form of a liquid additive, for example, an amount ranging from about 0.1 gallons of the friction reducer per thousand gallons of the wellbore servicing fluid ("GPT") to about 4 GPT or more. Alternatively, an amount ranging from about 0.1 GPT to about 0.5 GPT, an amount ranging from about 0.5 GPT to about 0.7 GPT, an amount ranging from about 0.7 GPT to about 1 GPT, an amount ranging from about 1 GPT to about 1.3 GPT, an amount ranging from about 1.3 GPT to about 1.6 GPT, an amount ranging from about 1.6 GPT to about 2 GPT, an amount ranging from about 2 GPT to about 2.5 GPT, an amount ranging from about 2.5 GPT to about 3 GPT, an amount ranging from about 3 GPT to about 3.5 GPT, an amount ranging from about 3.5 GPT to about 4 GPT, or alternatively, an amount ranging between any of the previously recited ranges. When provided as a liquid additive, the friction reducer can be in the form of an emulsion, a liquid concentrate, or both. One of ordinary skill will understand that a volume ratio such as GPT is equivalent to a volume ratio using a different basis such as liters or cubic meters. Additionally, the friction reducer can be provided as a dry additive and may be present in an amount ranging from about 0.0001% wt. % to about 1 wt. % or more based on a total weight of the wellbore servicing fluid. Alternatively an amount ranging from about 0.0001 wt. % to about 0.025 wt. %, an amount ranging from about 0.025 wt. % to about to about 0.04 wt. %, an amount ranging from about 0.04 wt. % to about 0.06 wt. %, an amount ranging from about 0.06 wt. % to about 0.09 wt. %, an amount ranging from about 0.09 wt. % to about 0.12 wt. %, an amount ranging from about 0.12 wt. % to about 0.15 wt. %, an amount ranging from about 0.15 wt. % to about 0.2 wt. %, an amount ranging from about 0.2 wt. % to about 0.25 wt. %, an amount ranging from about 0.25 wt. % to about 0.3 wt. %, an amount ranging from about 0.3 wt. % to about 0.35 wt. %, an amount ranging from about 0.35 wt. % to about 0.4 wt. %, an amount ranging from about 0.45 wt. % to about 0.5 wt. %, an amount ranging from about 0.5 wt. % to about 1 wt. %, or alternatively, an amount ranging between any of the previously recited ranges.

The wellbore servicing fluid can include an aqueous fluid. The aqueous fluid can include fresh water, surface water, ground water, produced water, salt water, or any other suitable water. Surface water can be from lakes, rivers, estuaries, and oceans for example; ground water can be from aquifers and water wells. One example of produced water is water that flows from a hydrocarbon well. Hydrocarbon wells often penetrate subterranean formations that contain a fraction of water alongside hydrocarbons. As such, fluids that are produced from a hydrocarbon well may contain hydrocarbons as well as a fraction of water. The produced fluids may be separated at the surface to generate a hydrocarbon stream and a water stream. The water stream may be further utilized to mix fluids for well treatment such as drilling, cementing, stimulation, and enhanced recovery operations. In an aspect, a portion of the water stream is a component of the wellbore servicing fluid of the present disclosure. The separated water stream may be referred to as produced water. The term "salt water" is used herein to mean unsaturated salt solutions and saturated salt solutions including brines and seawater.

The aqueous fluid may include dissolved species of salts and metals. Examples of dissolved species may include, but are not limited to, lithium, sodium, potassium, beryllium, magnesium, calcium, strontium, iron, zinc, manganese, molybdenum, sulfur in the form of hydrogen sulfide, other sulfides, and sulfates, arsenic, barium, boron, chromium, selenium, uranium, fluorine, chlorine, bromine, iodine, and combinations thereof. One of ordinary skill in the art will understand that the present list of dissolved species is not exhaustive of all possible species dissolved in a particular sample of the aqueous fluid. Furthermore, one of ordinary skill in the art will understand that particular dissolved species may be of concern with regards to performance of a particular fiction reducing polymer than other species.

In one or more aspects, the aqueous fluid includes a formulation water (also referred to as a base water), a makeup water, a recycled water, a flow-back water, or combinations thereof. A formulation water or base water is water used at a beginning of preparation of the wellbore servicing fluid, for example, to blend with solid components and other additives of the wellbore servicing fluid. Makeup water is water added to compensate for losses (e.g., losses caused by evaporation or leakage) during preparation of the wellbore servicing fluid and fracturing operation. Recycled water and flow-back water are water from a wellbore during and/or following a treatment. Flow-back water can be obtained in preparation for a subsequent phase of treatment or in preparation for cleanup and returning the well to production.

During preparation of wellbore servicing fluids, freshwater may be used as a base water with additional makeup water used to make up the remaining volume of fluid required for an application. Makeup water may be from any source as described above including surface water, ground water, and produced water, for example. Each of the sources of water may have varying levels of species dissolved therein, including those species previously described, which may affect the stability of friction reducers added to the water.

The aqueous fluid may be present in any amount by weight suitable for a particular application, such as a hydraulic fracturing application. For example, without limitation, the aqueous fluid may be present in an amount ranging from about 50 wt. % to about 100 wt. % based on a total weight of the wellbore servicing fluid. Alternatively, an amount ranging from about 50 wt. % to about 60 wt. %, an amount ranging from about 60 wt. % to about 70 wt. %, an amount ranging from about 70 wt. % to about 80 wt. %, an amount ranging from about 80 wt. % to about 90 wt. %, or an amount ranging from about 90 wt. % to about 100 wt. %. One of ordinary skill in the art with the benefit of this disclosure should be able to select an appropriate weight percent of water for a particular wellbore servicing fluid.

In some aspects, the subterranean formation includes a formation brine. A downhole environment of a wellbore (e.g., surrounding subterranean formation) includes hydrocarbon-containing reservoirs which may contain various fluid phases including an aqueous reservoir fluid, hydrocarbon fluids, vapors, gases, or combinations thereof. Pores in the hydrocarbon-containing reservoirs are usually saturated by the aqueous reservoir fluid before migration of the hydrocarbon fluids. The aqueous reservoir fluid may be connate water, or groundwater that is trapped in the pores of a rock during formation of sedimentation. The aqueous reservoir fluid may also be formation water or interstitial water where water is found in the pores spaces of a rock and may not have been present during rock formation. Whether found in the pores or in the pore spaces, the aqueous reservoir fluid may be referred to as formation brine.

The subterranean formations may contain varying volumes of formation brine. Some formations may contain a relatively large fraction of formation brine such that a volume of wellbore servicing fluid introduced therein may be diluted to a greater extent than a formation that contains a relatively smaller fraction of formation brine. Additionally, some formations may contain similar fractions of formation brine but may differ in concentration of dissolved species within the formation brine. In such examples, a diluted wellbore servicing fluid formed may have disparate concentrations of dissolved species depending on the concentration of dissolved species in formation brine. In general, the fluid content of a formation may be measured and/or estimated using open-hole or cased hole logging techniques as well as seismic logging techniques each of which may provide guidance to the fluid volume and dissolved species therein. While a formation brine is not typically directly added to a wellbore servicing fluid during preparation of the wellbore servicing fluid, once the wellbore servicing fluid is introduced into the formation, the wellbore servicing fluid and the formation brine may contact and mix.

In one or more aspects, at least one of the aqueous fluid, the formation brine, and the subterranean formation include iron. The iron can include ferrous iron, ferric iron, or both. The iron can be in the form of iron ions and/or any other form, for example an iron-containing compound. In aspects, when water (e.g., a formation brine, an aqueous fluid) contacts the subterranean formation including iron, the iron in the subterranean formation gradually dissolves in the water over a period of time. In aspects, the dissolved iron is in the form of iron ions.

In one or more aspects, the aqueous fluid, the formation brine, or both include iron ions. The iron ions can include ferrous ions and ferric ions. Concentration of the iron ions in water (e.g., makeup water, formation brine) may be low single digit parts per million, while some water may have iron concentrations that reach 20-80 ppm, 200-400 ppm, or higher. It is to be understood that at lower iron concentrations the formation of precipitates of friction reducers may occur slower, and gradually over a period of time. In such aspects, the precipitates of friction reducers continue to be deposited and accumulated in equipment on the surface of the wellsite and/or in the wellbore, which may cause equipment damage as well as formation damage.

The iron ions can be present in at least one of the aqueous fluid and the formation brine in an amount of from about 20 ppm to about 13,000 ppm, alternatively from about 20 ppm to about 10,500 ppm, alternatively from about 20 ppm to about 7,500 ppm, alternatively from about 20 ppm to about 5,000 ppm, alternatively from about 20 ppm to about 2,500 ppm, or alternatively from about 20 ppm to about 300 ppm.

In one or more aspects, the iron control agent reacts with at least a portion of the iron ions. The reaction can reduce the concentration of the iron ions in the wellbore servicing fluid and/or the formation brine, thus prevents the iron ions from forming precipitates with the friction reducers.

In one or more aspects, a molar ratio of the iron control agent to the iron ions present in a total of the wellbore servicing fluid and the formation brine is from about 1:5 to about 2:1, alternatively from about 1:5 to about 1:1, or alternatively from about 1:2 to about 1:1.

In one or more aspects, at least one of the aqueous fluid and the formation brine includes additional ionic species (e.g., cationic species, anionic species, or both). Nonlimiting examples of additional ions that may be present in the aqueous fluid, formation brine or both include calcium ions, magnesium ions, sodium ions, barium ions, chloride ions, potassium ions, strontium ions, or combinations thereof. In one or more aspects, the additional ions are present in the at least one of the aqueous fluid and the formation brine in an amount of from about 20 ppm to about 200,000 ppm, alternatively from about 100 ppm to about 150,000 ppm, alternatively from about 100 ppm to about 120,000 ppm, alternatively from about 200 ppm to about 100,000 ppm, or alternatively from about 300 ppm to about 80,000 ppm.

In one or more aspects, the wellbore servicing fluid further includes proppants. The proppants can include a variety of solid particles, including, but not limited to, sand, bauxite, ceramic materials, glass materials, polymer materials, polytetrafluoroethylene materials, nutshell pieces, cured resinous particulates including nutshell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material. The filler materials can include silica, alumina, fumed carbon, carbon black, graphite, mica, titanium dioxide, meta-silicate, calcium silicate, kaolin, talc, zirconia, boron, fly ash, hollow glass microspheres, solid glass, or combinations thereof. The proppants can have any suitable particle size for a particular application such as, without limitation, nano particle size, micron particle size, or any combinations thereof. As used herein, the term particle size refers to a d50 particle size distribution, wherein the d50 particle size distribution is the value of the particle diameter at 50% in the cumulative distribution. The d50 particle size distribution may be measured by particle size analyzers such as those manufactured by Malvern Instruments, Worcestershire, United Kingdom. As used herein, nano-size is understood to mean any proppant with a d50 particle size distribution of less than 1 micron. For example, a proppant with a d50 particle size distribution at point ranging from about 10 nanometers to about 1 micron. Alternatively, a proppant with a d50 particle size distribution at point ranging from about 10 nanometers to about 100 nanometers, a proppant with a d50 particle size distribution at point ranging from about 100 nanometers to about 300 nanometers, a proppant with a d50 particle size distribution at point ranging from about 300 nanometers to about 700 nanometers, a proppant with a d50 particle size distribution at point ranging from about 700 nanometers to about 1 micron, or a proppant with a d50 particle size distribution between any of the previously recited ranges. As used herein, micron-size is understood to mean any proppant with a d50 particle size distribution at a point ranging from about 1 micron to about 1000 microns. Alternatively, a proppant with a d50 particle size distribution at point ranging from about 1 micron to about 100 microns, a proppant with a d50 particle size distribution at point ranging from about 100 microns to about 300 microns, a proppant with a d50 particle size distribution at point ranging from about 300 microns to about 700 micron, a proppant with a d50 particle size distribution at point ranging from about 700 microns to about 1000 microns, or a proppant with a d50 particle size distribution between any of the previously recited ranges.

Alternatively, proppant particle sizes may be expressed in U.S. mesh sizes such as, for example, 20/40 mesh (212 μm-420 μm). The proppants expressed in U.S. mesh sizes may include proppants with particle sizes at a point ranging from about 8 mesh to about 140 mesh (106 μm-2.36 mm). Alternatively, a point ranging from about 16-30 mesh (600 μm-1180 μm), a point ranging from about 20-40 mesh (420 μm-840 μm), a point ranging from about 30-50 mesh (300 μm-600 μm), a point ranging from about 40-70 mesh (212 μm-420 μm), a point ranging from about 70-140 mesh (106 μm-212 μm), or alternatively any range there between. The standards and procedures for measuring a particle size or particle size distribution may be found in ISO 13503, or, alternatively in API RP 56, API RP 58, API RP 60, or any combinations thereof.

The proppants can have any suitable density. In some aspects, the proppants have a density at a point ranging from about 1.25 g/cm$^3$ to about 10 g/cm$^3$. The proppants can include any shape, including but not limited to, spherical, toroidal, amorphous, planar, cubic, or cylindrical. The proppants can further include any roundness and sphericity. The proppant can be present in the wellbore servicing fluid in any concentration or loading. Without limitation, the proppants can be present a point ranging from about 0 pounds per gallon ("lb/gal") (0 kg/m$^3$) to about 20 lb/gal (2396.5 kg/m$^3$). Alternatively, a point ranging from about 0 lb/gal (0 kg/m$^3$) to about 0.1 lb/gal (12 kg/m$^3$), a point ranging from about 0.1 lb/gal (12 kg/m$^3$) to about 1 lb/gal (119.8 kg/m$^3$), a point ranging from about 1 lb/gal (119.8 kg/m$^3$) to about 3 lb/gal (359.4 kg/m$^3$), a point ranging from about 3 lb/gal (359.4 kg/m$^3$) to about 6 lb/gal (718.8 kg/m$^3$), a point ranging from about 6 lb/gal (718.8 kg/m$^3$) to about 9 lb/gal (1078.2 kg/m$^3$), a point ranging from about 9 lb/gal (1078.2 kg/m$^3$) to about 12 lb/gal (1437.6 kg/m$^3$), a point ranging from about 12 lb/gal (1437.6 kg/m$^3$) to about 14 lb/gal (1677.2 kg/m$^3$), a point ranging from about 14 lb/gal (1677.2 kg/m$^3$) to about 20 lb/gal (2396.5 kg/m$^3$), or alternatively, any range therebetween.

The wellbore servicing fluid can further include a gelling agent. In an aspect, the gelling agent is included in a wellbore servicing fluid of the present disclosure to increase the wellbore servicing fluid's viscosity which may be desired for some types of subterranean applications. For example, an increase in viscosity may be used for transferring hydraulic pressure to divert wellbore servicing fluids to another part of a formation or for preventing undesired leak-off of fluids into a formation from the buildup of filter cakes. The increased viscosity of the gelled or gelled and cross-linked wellbore servicing fluid, among other things, may reduce fluid loss and may allow the fracturing fluid to transport significant quantities of suspended proppant. Gelling agents may include locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

In aspects, the gelling agent has a molecular weight in a range of from about 1.2 MM Daltons (Da) to about 5 MM Da, alternatively from about 1.2 MM Da to about 4.5 MM Da, or alternatively from about 1.5 MM Da to about 4.5 MM Da. The gelling agent can be present in the wellbore servicing fluid in an amount ranging from about 0.5 lbs/1,000 gal of the wellbore servicing fluid (0.05991 kg/m$^3$) to about 200 lbs/1,000 gal (23.946 kg/m$^3$). Alternatively, in an amount ranging from about 5 lbs/1,000 gal (0.5991 kg/m$^3$) to about 10 lbs/1,000 gal (1.198 kg/m$^3$), in an amount ranging from about 10 lbs/1,000 gal (1.198 kg/m$^3$) to about 15 lb/1,000 gal (1.797 kg/m$^3$), in an amount ranging from about 15 lb/1,000 gal (1.797 kg/m$^3$) to about 20 lb/1,000 gal (2.3946 kg/m$^3$), or alternatively, an amount ranging between any of the previously recited ranges.

The gelling agent can be present in the wellbore servicing fluid in an amount of from about 0.001 wt. % to about 3 wt. %, based on the total weight of the wellbore servicing fluid, alternatively from about 0.01 wt. % to about 2 wt. %, or alternatively from about 0.1 wt. % to about 1 wt. %.

In aspects, the wellbore servicing fluid further includes one or more additives. The one or more additives can include a strength-stabilizing agent, an emulsifier, an expansion agent, a salt, a fluid loss agent, a vitrified shale, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, crosslinking agents, weight-reducing agents, clay control agents, fluid loss control additives, flocculants, water softeners, foaming agents, oxidation inhibitors, thinners, scavengers, gas scavengers, lubricants, bridging agents, a foam stabilizer, catalysts, dispersants, breakers, emulsion thinner, emulsion thickener, pH control additive, lost circulation additives, buffers, crosslinkers, stabilizers, chelating agents, oxidizers, a clay, reducers, consolidating agent, complexing agent, sequestration agent, control agent, an oxidative breaker, and the like, or combinations thereof. The oxidative breaker can include bromate, persulfate, perborate, and perbromate, for example. With the benefit of this disclosure, one of ordinary skill in the art should be able to recognize and select one or more suitable optional additives for use in the wellbore servicing fluid.

In aspects, the one or more additives are present in the wellbore servicing fluid in an amount of from about 0.01 GPT to about 5 GPT based on the total volume of the wellbore servicing fluid, alternatively from about 0.1 GPT to about 4 GPT, alternatively from about 0.1 GPT to about 3 GPT.

A wellbore servicing fluid of the type disclosed herein can be prepared using any suitable method. In aspects, the method includes placing components of the wellbore servicing fluid into a container (e.g., a mixer, a blender) and blending the components of the wellbore servicing fluid to form a pumpable fluid (e.g., a homogeneous fluid). The container can be any container that is compatible with the components of the wellbore servicing fluid and has sufficient space. A blender or mixer can be used for blending/mixing the components of the wellbore servicing fluid. The wellbore servicing fluid can include a friction reducer, an iron control agent of the type disclosed herein, and an aqueous fluid. In one or more aspects, the iron control agent includes a compound according to Structure I, a salt of Structure I, or combinations thereof. The wellbore servicing fluid can further include a proppant.

The wellbore servicing fluid can be prepared at the wellsite. For example, dry components of the wellbore servicing fluid (e.g., the proppants, the gelling agent, the one or more additives) can be transported to the wellsite and combined (e.g., mixed/blended) with water located proximate the wellsite to form the wellbore servicing fluid. The water can be conveyed from a source to the wellsite or be available at the wellsite prior to the combining. The dry components can be prepared at a location remote from the wellsite and transported to the wellsite, and, if necessary, stored at the on-site location. When it is desirable to prepare the wellbore servicing fluid on the wellsite, the dry components along with additional water and other additives can be added into a container (e.g. a blender tub, for example mounted on a trailer), and are then blended until a pumpable fluid (e.g., a homogeneous fluid) is formed. Additives can be added to the wellbore servicing fluid during preparation thereof (e.g., during blending) and/or on-the-fly (e.g., in real time or on-location) by addition to (e.g., injection into) the wellbore servicing fluid when being pumped into the wellbore. Alternatively, the wellbore servicing fluid can be formulated offsite and transported to a wellsite. In one or more aspects, the wellbore servicing fluid prepared as disclosed herein is placed in a wellbore, wherein the wellbore servicing fluid contacts an aqueous formation fluid (e.g., a formation brine) including iron ions.

In one or more aspects, the wellbore servicing fluid has a viscosity of from about 1 cP to about 50 cP, alternatively from about 1 cP to about 25 cP, alternatively from about 3 cP to about 25 cP, or alternatively from about 3 cP to about 20 cP. The viscosity can be measured on a FANN 35 viscometer or similar instrument at a shear rate of about 511 $s^{-4}$.

In aspects, the wellbore servicing fluid has a density of from about 5 lb/gal (ppg) to about 20 ppg, alternatively from about 5 ppg to about 18 ppg or alternatively from about 7 ppg to about 18 ppg.

In aspects, the precipitates of friction reducers in the wellbore servicing fluid are in a range of from about 0 wt. % to about 5 wt. %, alternatively from about 0 wt. % to about 4 wt. %, alternatively from about 0 wt. % to about 3 wt. %, or alternatively from about 0 wt. % to about 2 wt. %, based on the total weight of the wellbore servicing fluid. In one or more aspects, in a downhole environment, the precipitates of friction reducers are in a range of from about 0 wt. % to about 5 wt. %, alternatively from about 0 wt. % to about 4 wt. %, alternatively from about 0 wt. % to about 3 wt. %, or alternatively from about 0 wt. % to about 2 wt. %, based on the total weight of the wellbore servicing fluid and the formation brine.

A wellbore servicing fluid of the type disclosed herein can be used as a fracturing fluid. In fracturing operations, the wellbore servicing fluid (e.g., a fracturing fluid) is pumped at high-pressure into a wellbore. The wellbore servicing fluid may then be introduced into a portion of a subterranean formation at a pressure sufficient to create or enhance at least one fracture in the subterranean formation. The wellbore servicing fluid can be introduced at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. At least one proppant can be deposited in the at least one fracture. Hydraulic fracturing may desirably create high-conductivity fluid communication between the wellbore and the subterranean formation.

Figure 2:
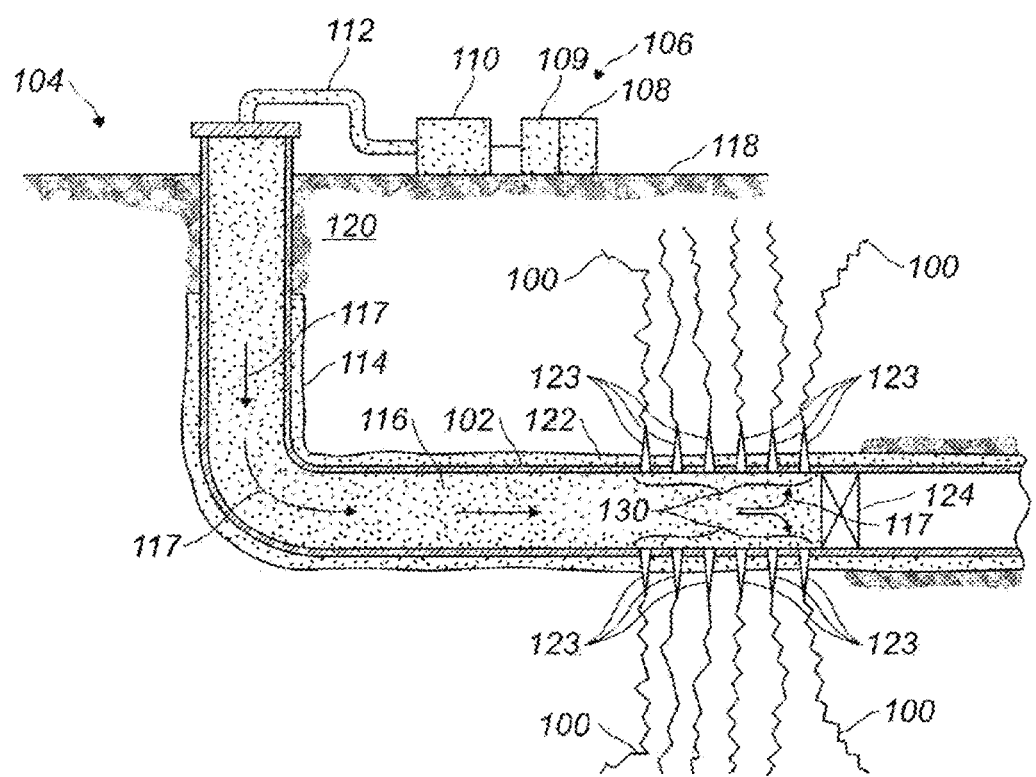
FIG. 2 is a schematic view of an example well system utilized for hydraulic fracturing.

FIG. 2 illustrates an example of a well system 104 that may be used to introduce proppant 116 into fractures 100. Well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a fracturing fluid 117 of the type disclosed herein, which may include proppant 116 into wellbore 114. Proppant 116 may be any of the proppants described herein. The fluid supply 108 and pumping equipment 110 may be above the surface 118 while the wellbore 114 is below the surface 118.

Well system 104 may also be used for the pumping of a pad or pre-pad fluid into the subterranean formation at a pumping rate and pressure at or above the fracture gradient of the subterranean formation to create and maintain at least one fracture 100 in subterranean formation 120. The pad or pre-pad fluid may be substantially free of solid particles such as proppant, for example, less than 1 wt. % by weight of the pad or pre-pad fluid. The pad or pre-pad fluid can be a wellbore servicing fluid of the type disclosed herein. Well system 104 may then pump the fracturing fluid 117, which can be a wellbore servicing fluid of the type disclosed herein, into subterranean formation 120 surrounding the wellbore 114. Generally, a wellbore 114 may include horizontal, vertical, slanted, curved, and other types of wellbore geometries and orientations, and the proppant 116 may generally be applied to subterranean formation 120 surrounding any portion of wellbore 114, including fractures 100. The wellbore 114 may include the casing 102 that may be cemented (or otherwise secured) to the wall of the wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 100. A plug 124, which may be any type of plug for oilfield applications (e.g., bridge plug), may be disposed in wellbore 114 below the perforations 123.

In accordance with systems and/or methods of the present disclosure, a perforated interval of interest 130 (depth interval of wellbore 114 including perforations 123) may be isolated with plug 124. A pad or pre-pad fluid may be pumped into the subterranean formation 120 at a pumping rate and pressure at or above the fracture gradient to create and maintain at least one fracture 100 in subterranean formation 120. Then, proppant 116 may be mixed with an aqueous fluid and other components via mixing equipment 109, thereby forming a fracturing fluid 117 of the type disclosed herein, and then may be pumped via pumping equipment 110 from fluid supply 108 down the interior of casing 102 and into subterranean formation 120 at or above a fracture gradient of the subterranean formation 120. Pumping the fracturing fluid 117 at or above the fracture gradient of the subterranean formation 120 may create (or enhance) at least one fracture (e.g., fractures 100) extending from the perforations 123 into the subterranean formation 120. Alternatively, the fracturing fluid 117 may be pumped down production tubing, coiled tubing, or a combination of coiled tubing and annulus between the coiled tubing and the casing 102.

At least a portion of the fracturing fluid 117 may enter the fractures 100 of subterranean formation 120 surrounding wellbore 114 by way of perforations 123. Perforations 123 may extend from the interior of casing 102, through cement sheath 122, and into subterranean formation 120.

Figure 3:
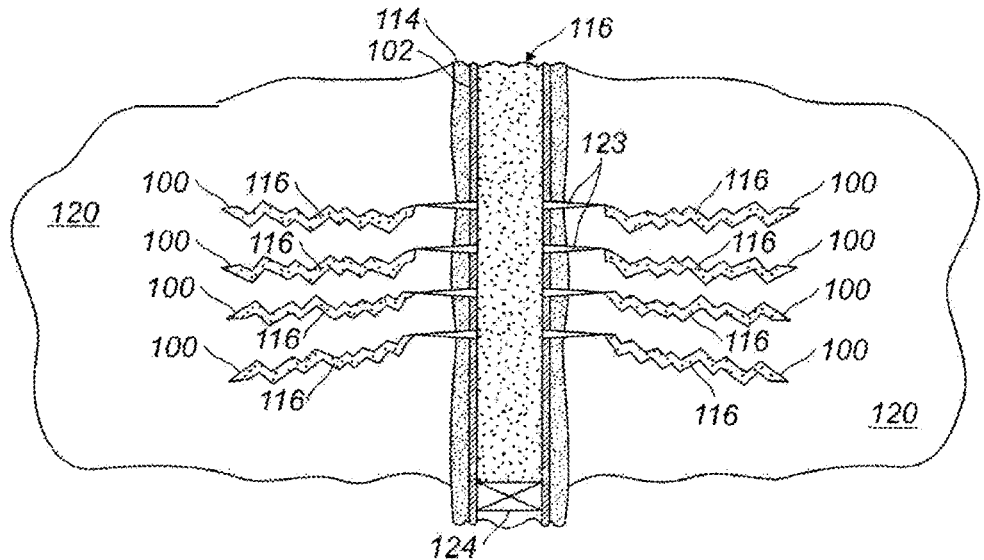
FIG. 3 is a schematic view of an example of a wellbore after introduction of a fracturing fluid.

Referring to FIG. 3, the wellbore 114 is shown after placement of the proppant 116 in accordance with systems and/or methods of the present disclosure. Proppant 116 may be positioned within fractures 100, thereby propping open fractures 100.

The pumping equipment 110 may include a high pressure pump. As used herein, the term "high pressure pump" refers to a pump that is capable of delivering the fracturing fluid 117 and/or pad/pre-pad fluid downhole at a pressure of about 1000 psi (6894 kPa) or greater. A high pressure pump may be used when it is desired to introduce the fracturing fluid 117 and/or pad/pre-pad fluid into subterranean formation 120 at or above a fracture gradient of the subterranean formation 120, but it may also be used in cases where fracturing is not desired. Additionally, the high pressure pump may be capable of fluidly conveying particulate matter, such as the proppant 116, into the subterranean formation 120. Suitable high pressure pumps may include, but are not limited to, floating piston pumps and positive displacement pumps. Without limitation, the initial pumping rates of the pad fluid, pre-pad fluid and/or fracturing fluid 117 may range from about 15 barrels per minute ("bbl/min") (2385 l/min) to about 120 bbl/min (19079 l/min), enough to effectively create a fracture into the formation and place the proppant 116 into at least one fracture 101.

Alternatively, the pumping equipment 110 may include a low pressure pump. As used herein, the term "low pressure pump" refers to a pump that operates at a pressure of about 1000 psi (6894 kPa) or less. A low pressure pump may be fluidly coupled to a high pressure pump that may be fluidly coupled to a tubular (e.g., wellbore supply conduit 112). The low pressure pump may be configured to convey the fracturing fluid 117 and/or pad/pre-pad fluid to the high pressure pump. The low pressure pump may "step up" the pressure of the fracturing fluid 117 and/or pad/pre-pad fluid before it reaches the high pressure pump.

Mixing equipment 109 may include a mixing tank that is upstream of the pumping equipment 110 and in which the wellbore servicing fluid (e.g., fracturing fluid 117, pad or pre-pad fluid) may be formulated. The pumping equipment 110 (e.g., a low pressure pump, a high pressure pump, or a combination thereof) may convey the wellbore servicing fluid from the mixing equipment 109 or other source of the wellbore servicing fluid to the casing 102. Alternatively, the wellbore servicing fluid may be formulated offsite and transported to a worksite, in which case the wellbore servicing fluid may be introduced to the casing 102 via the pumping equipment 110 directly from its shipping container (e.g., a truck, a railcar, a barge, or the like) or from a transport pipeline. In either case, the wellbore servicing fluid may be drawn into the pumping equipment 110, elevated to an appropriate pressure, and then introduced into the casing 102 for delivery downhole.

A hydraulic fracturing operation may operate in stages where a bridge plug, frac plug, or other obstruction is inserted into the wellbore to prevent fluid communication with a region of the wellbore after the bridge plug. A perforating gun including explosive shaped charges may be inserted into a region of the wellbore before the bridge plug (i.e. a region where the measured depth is less than the measured depth of the bridge plug) and perforate holes through the walls of the wellbore. The perforating gun may be removed from the wellbore and a fracturing fluid introduced thereafter. The stage is completed when the planned volume of fluid and proppant has been introduced into the subterranean formation. Another stage may begin with the insertion of a second bridge plug into a wellbore region before the bridge plug.

The exemplary wellbore servicing fluids disclosed herein may directly or indirectly affect one or more components or pieces of equipment associated with the preparation, delivery, recapture, recycling, reuse, and/or disposal of the disclosed wellbore servicing fluids. For example, the disclosed wellbore servicing fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary wellbore servicing fluids. The disclosed wellbore servicing fluids may also directly or indirectly affect any transport or delivery equipment used to convey the wellbore servicing fluids to a well site or downhole such as, for example, any transport vessels, conduits, pipelines, trucks, tubulars, and/or pipes used to compositionally move the wellbore servicing fluids from one location to another, any pumps, compressors, or motors (e.g., topside or downhole) used to drive the wellbore servicing fluids into motion, any valves or related joints used to regulate the pressure or flow rate of the wellbore servicing fluids, and any sensors (i.e., pressure and temperature), gauges, and/or combinations thereof, and the like. The disclosed wellbore servicing fluids may also directly or indirectly affect the various downhole equipment and tools that may come into contact with the wellbore servicing fluids such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 4:
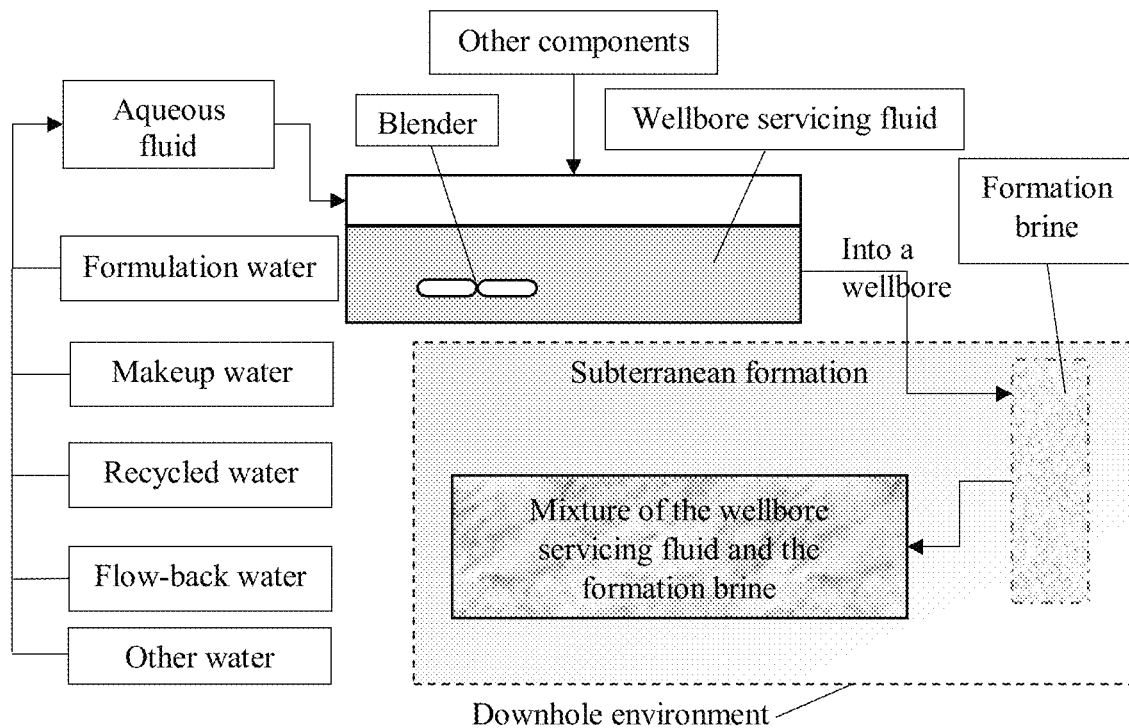
FIG. 4 is a process flow diagram in accordance with some aspects in the present disclosure.

The method disclosed herein can achieve iron mitigation in various scenarios, for example the four scenarios as discussed hereinbelow. Referring to FIG. 4, as discussed above, the aqueous fluid can include a formulation water, a makeup water, a recycled water, a flow-back water, other water, or combinations thereof.

In the first scenario, the subterranean formation does not include a formation brine, or includes a formation brine including iron ions in an amount of less than about 20 ppm. Additionally, iron ions are present in at least one of the waters forming the aqueous fluid and thus are included in the aqueous fluid, and the amount of iron ions in the aqueous fluid is greater than about 100 ppm. The aqueous fluid and other components (e.g., an iron control agent of the type disclosed herein, a friction reducer) of the wellbore servicing fluid are placed into a container and blended therein to form the wellbore servicing fluid including iron ions. The iron control agent can react with at least a portion of the iron ions in the aqueous fluid, upon contacting the iron ions. Thus, the iron ions in the wellbore servicing fluid can be reduced, and precipitates of friction reducers can be mitigated. Then the wellbore servicing fluid is placed into the wellbore penetrating at least a portion of a subterranean formation. Because the subterranean formation in this scenario does not include a formation brine, or include a formation brine including iron ions in an amount of less than about 20 ppm, the amount of iron ions in the formation brine can be ignored. In this scenario, the majority of iron mitigation occurs during preparation of the wellbore servicing fluid. Without the iron control agent, precipitates of friction reducer may be generated during and after the preparation of the wellbore servicing fluid.

In the second scenario, the iron ions are included in the aqueous fluid in an amount of less than about 20 ppm. In such aspects, the iron ions are included in a total (e.g., a mixture) of the wellbore servicing fluid and the formation brine in an amount of greater than about 100 ppm. The aqueous fluid and other components (e.g., an iron control agent of the type disclosed herein, a friction reducer) of the wellbore servicing fluid are placed into a container and blended therein to form the wellbore servicing fluid. Then the wellbore servicing fluid is placed into the wellbore and mixed with the formation brine in the downhole environment. The mixture of the wellbore servicing fluid and the formation brine is also referred to as a diluted wellbore servicing fluid. In this scenario, the iron control agent in the wellbore servicing fluid can react with the iron ions in the formation brine, upon mixing of the wellbore servicing fluid and the formation brine. Without the iron control agent, precipitates of friction reducers may be generated when the wellbore servicing fluid is introduced into the subterranean formation and the iron ions in the formation brine contact the friction reducer. In this scenario, the majority of iron mitigation occurs in the downhole environment.

In the third scenario, the iron ions are included in the formation brine in an amount of greater than about 100 ppm. In such aspects, the iron ions are also included in the aqueous fluid in an amount of greater than about 20 ppm. The aqueous fluid and other components (e.g., an iron control agent of the type disclosed herein, a friction reducer) of the wellbore servicing fluid are placed into a container and blended therein to form the wellbore servicing fluid including iron. A first portion of the iron control agent can react with at least a portion of the iron ions in the aqueous fluid, upon contacting the iron ions. Then the wellbore servicing fluid is placed into the wellbore penetrating at least a portion of a subterranean formation. During mixing of the wellbore servicing fluid and the formation brine in the downhole environment, the iron ions in the formation brine can react with a second portion of the iron control agent in the wellbore servicing fluid. Without the iron control agent, precipitates of friction reducers may be generated during the preparation of the wellbore servicing fluid, and when the wellbore servicing fluid is introduced into the subterranean formation and the iron ions in the formation brine contact the friction reducer. In this scenario, iron mitigation occurs both during preparation of the wellbore servicing fluid and in the downhole environment.

In the fourth scenario, the iron ions are included in the aqueous fluid in an amount of less than about 20 ppm; the subterranean formation does not include a formation brine, or includes a formation brine including iron ions in an amount of less than about 20 ppm. In such aspects, the subterranean formation includes irons for example in the form of an iron-containing compound. The aqueous fluid and other components (e.g., an iron control agent of the type disclosed herein, a friction reducer) of the wellbore servicing fluid are placed into a container and blended therein to form the wellbore servicing fluid. Then the wellbore servicing fluid is placed into the wellbore and mixed with the formation brine if there is any in the downhole environment. In this scenario, iron in the subterranean formation gradually dissolve in the mixture of the wellbore servicing fluid and the formation brine over a period of time, forming an iron-containing fluid including iron ions in an amount of greater than about 100 ppm. The period of time can be within the time scope of the fracturing operation. The iron control agent in the wellbore servicing fluid can react with the iron ions in the iron-containing fluid. Without the iron control agent, precipitates of friction reducers may be generated when the iron in the subterranean formation dissolves and forms the iron-containing fluid. In this scenario, the majority of iron mitigation occurs in the downhole environment.

Also disclosed herein is a method of servicing a wellbore penetrating at least a portion of a subterranean formation. The method can include: placing a solid-free fracturing fluid (e.g., a pad fluid) into the wellbore at an injection rate for generating a treating pressure above a fracture gradient to create one or more fractures in the subterranean formation. The solid-free fracturing fluid can include a friction reducer, an iron control agent of the type disclosed herein, and an aqueous fluid. In one or more aspects, the method further includes placing a mixture of the solid-free fracturing fluid and proppants into the wellbore to place at least one proppant into the one or more fractures. In one or more aspects, the subterranean formation includes a formation brine. The aqueous fluid, the formation brine, or both can include iron ions. In an aspect, the friction reducer includes an acrylamide polymer or copolymer. In an aspect, the friction reducer is anionic.

Various benefits may be realized by utilization of the presently disclosed methods and compositions. By incorporating the iron control agent into the wellbore servicing fluid as disclosed herein, precipitates of friction reducer caused by iron ions in the aqueous fluid and/or the formation brine can be mitigated. Therefore, iron-related damages to friction reduction capability and to viscosifying properties of friction reducers can be mitigated.

EXAMPLES

The subject matter of the present disclosure having been generally described, the following examples are given as particular aspects of the disclosure and to demonstrate the practice and advantages thereof. It is understood that the examples are given by way of illustration and are not intended to limit the specification or the claims in any manner.

Example 1

Figure 5:
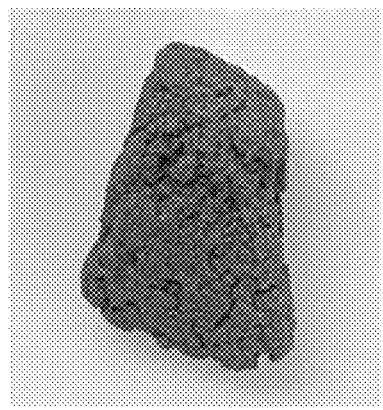
FIG. 5 is a photograph of a lab prepared friction reducer precipitate.

A friction reducer precipitate (lab-prepared gummy bear) was prepared according the following method: 2000 ppm of $Fe^{2+}$ ions (in the form of $FeCl_2$ or its hydrate) was added to 500 ml of tap water, followed by addition of 5 GPT of an anionic acrylamide copolymer-based friction reducer (emulsion, with about 40% by weight of dried acrylamide copolymer). It was observed that fluffy precipitates quickly formed when the iron ions and anionic acrylamide copolymer were mixed. The solution in the bottle was placed in 70° C. water bath for one day. Upon removal it was observed that precipitates had settled to the bottom of the solution and the solution was filtered. The filtered precipitates were then dried to form the lab-prepared gummy bear illustrated in FIG. 5.

Example 2

The ability of the iron control agents of the present disclosure to mitigate gummy bear formation was investigated. Specifically, three samples were prepared with local tap water in Houston area, 2000 ppm of $Fe^{2+}$ ions (in the form of $FeCl_2$ or its hydrate), and 5 GPT of an anionic acrylamide copolymer-based friction reducer. A sulfonated iminodialkanoic acid was added to the samples as an iron control agent in an amount of 0%, 20%, and 40% dose, respectively. The dose was the molar ratio of the sulfonated iminodialkanoic acid to iron. 20% dose means that the molar ratio of the sulfonated iminodialkanoic acid to the iron was 1:5 (or 20%). The sulfonated iminodialkanoic acid used in this example was N,N-diacetylhomotaurine.

Figure 6:
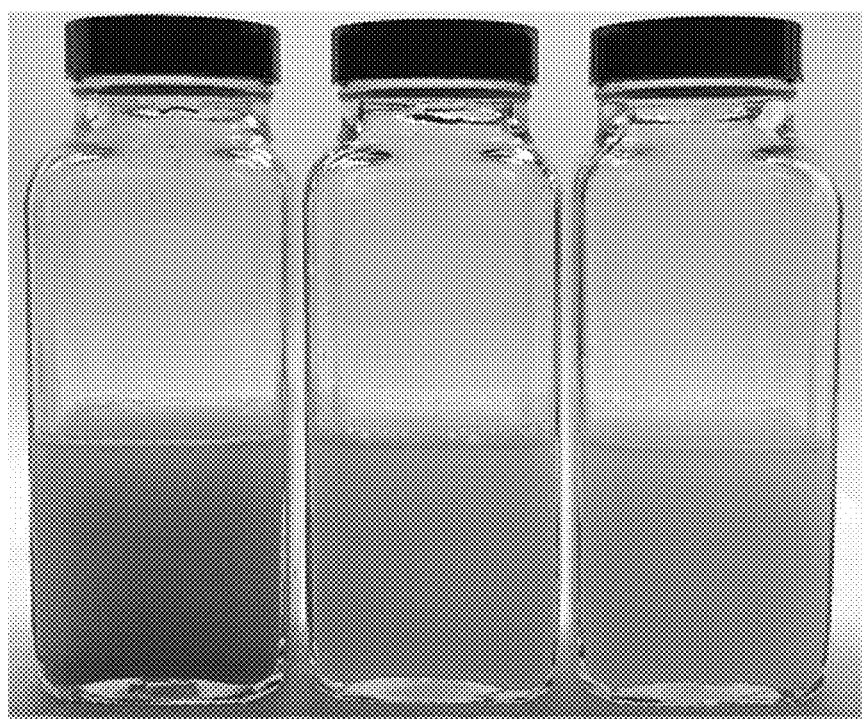
FIG. 6 is a photograph of anionic friction reducer solutions containing 0-40% dose of N,N-diacetylhomotaurine.

Referring to FIG. 6, from left to right, the samples contained 0%, 20%, and 40% dose of the sulfonated iminodialkanoic acid, respectively. The samples in FIG. 6 were prepared and photographed within one hour at room temperature. The left sample with 0% of the sulfonated iminodialkanoic acid appeared yellow-brown with some precipitations at the bottom, showing that gummy bears already started to form even at room temperature. On the contrary, the middle and the right samples showed homogenous greyish color without obvious precipitates, which could be due to the protection from the iron control agent in this example.

Figure 7:
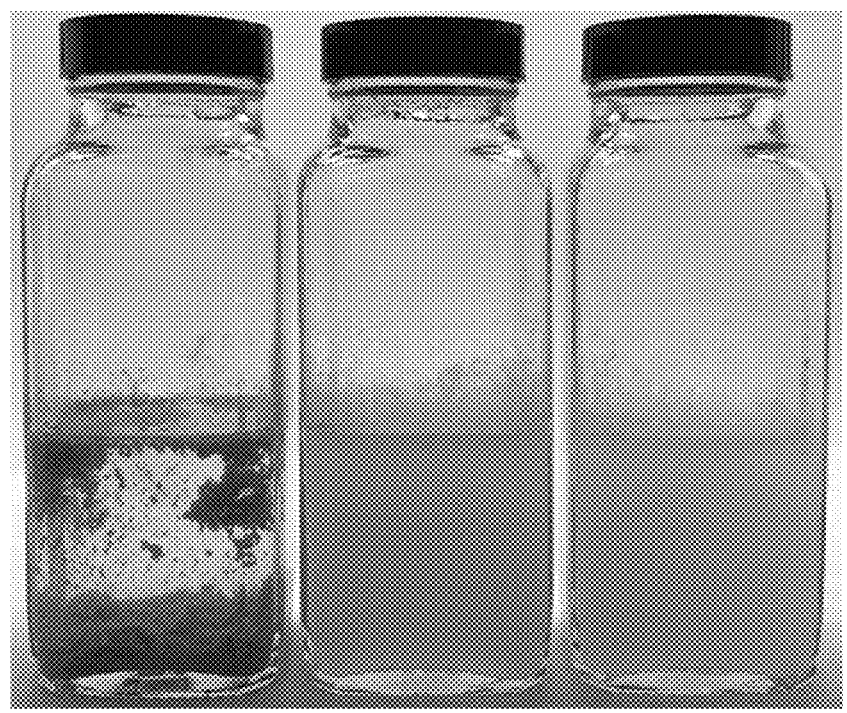
FIG. 7 is a photograph of anionic friction reducer solutions containing 0-40% dose of N,N-diacetylhomotaurine after being placed in a 70° C. water bath for one day.

The samples were then placed in a 70° C. water bath for one day. A photograph of the resulted samples is shown in FIG. 7, and different degrees of precipitates were observed. The left sample with 0% of the sulfonated iminodialkanoic acid contained brown-colored precipitations and suspensions, suggesting that gummy bears had been generated without addition of the iron control agent. The middle and the right samples showed no obvious precipitates. The comparison between the left sample and the other two samples demonstrated that the presence of the sulfonated iminodialkanoic acid had effectively prevented formation of iron-related gummy bears.

ADDITIONAL DISCLOSURE

The following is provided as additional disclosure for combinations of features and aspects of the present disclosure.

A first aspect, which is a method of servicing a wellbore penetrating at least a portion of a subterranean formation, comprising: placing a wellbore servicing fluid into a wellbore, wherein the wellbore servicing fluid comprises a friction reducer, an iron control agent, and an aqueous fluid, wherein the iron control agent comprises a compound according to Structure I, a salt of Structure I, or combinations thereof:

Structure I:

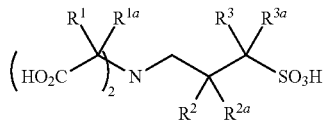

wherein $R^1$, $R^{1a}$, $R^2$, $R^{2a}$, $R^3$ and $R^{3a}$ are independently selected from a group consisting of H, —OH, halo, straight or branched $(C_1-C_6)$alkyl, straight or branched $(C_2-C_6)$alkenyl, straight or branched $(C_2-C_6)$alkynyl, $(C_3-C_{14})$aryl, $(C_3-C_{14})$-cycloalkyl, $(C_3-C_{14})$aryl$(C_1-C_6)$alkylene-, $(C_3-C_{14})$heteroaryl-$(C_1-C_6)$alkylene-, $(C_3-C_{14})$heteroaryl, $(C_3-C_{14})$heterocycloalkyl, $(C_3-C_{14})$heterocycloalkyl-$(C_1-C_6)$alkylene-, $(C_3-C_{14})$heteroaryl-$(C_3-C_6)$heterocycloalkylene-, $(C_3-C_{14})$aryl-$(C_3-C_{14})$heterocycloalkylene-, $(C_3-C_{14})$-aryl-$(C_1-C_6)$alkyl-$(C_3-C_{14})$heterocycloalkylene-, $(C_3-C_{14})$heteroaryl-$(C_1-C_6)$alkyl-$(C_3-C_{14})$heterocycloalkylene-, $(C_3-C_{14})$heterocycloalkyl-$(C_1-C_6)$alkyl-$(C_3-C_{14})$heterocycloalkylene-.

A second aspect, which is the method of the first aspect, wherein the subterranean formation comprises a formation brine.

A third aspect, which is the method of the second aspect, wherein at least one of the aqueous fluid, the formation brine, and the subterranean formation comprise iron.

A fourth aspect, which is the method of the third aspect, wherein the iron comprises ferrous iron, ferric iron, or both.

A fifth aspect, which is the method of the third or the fourth aspect, wherein the iron comprises iron ions.

A sixth aspect, which is the method of the fifth aspect, wherein the iron ions are present in at least one of the aqueous fluid and the formation brine in an amount of from about 20 ppm to about 13,000 ppm.

A seventh aspect, which is the method of the fifth or the sixth aspect, wherein at least one of the aqueous fluid and the formation brine further comprises additional ions.

An eighth aspect, which is the method of the seventh aspect, wherein the additional ions comprise calcium ions, magnesium ions, sodium ions, barium ions, chloride ions, potassium ions, strontium ions, or combinations thereof.

A ninth aspect, which is the method of the seventh or the eighth aspect, wherein the additional ions are present in the at least one of the aqueous fluid and the formation brine in an amount of from about 20 ppm to about 200,000 ppm.

A tenth aspect, which is the method of any of the first through the ninth aspects, wherein the iron control agent comprises a sulfonated iminodialkanoic acid, a related salt, or combinations thereof.

An eleventh aspect, which is the method of any of the first through the tenth aspects, wherein the iron control agent comprises N,N-diacetylhomotaurine.

A twelfth aspect, which is the method of any of the first through the eleventh aspects, wherein the iron control agent is present in the wellbore servicing fluid in an amount of from about 5.0E-2 mmol/L to about 100 mmol/L, based on the total volume of the wellbore servicing fluid.

A thirteenth aspect, which is the method of any of the fifth through the ninth aspects, wherein the iron control agent reacts with at least a portion of the iron ions.

A fourteenth aspect, which is the method of any of the fifth through the ninth aspects and the thirteenth aspect, wherein a molar ratio of the iron control agent to the iron ions present in a total of the wellbore servicing fluid and the formation brine is from about 1:5 to about 2:1.

A fifteenth aspect, which is the method of any of the first through the fourteenth aspects, wherein the friction reducer comprises an anionic friction reducer, a cationic friction reducer, a nonionic friction reducer, an amphoteric friction reducer, or combinations thereof.

A sixteenth aspect, which is the method of any of the first through the fifteenth aspects, wherein the friction reducer comprises a polyacrylamide, a polyacrylamide derivative, a synthetic polymer, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, polymers synthesized from one or more monomeric units selected from the group consisting of acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, their corresponding salts, and their corresponding esters, or combinations thereof.

A seventeenth aspect, which is the method of any of the first through the sixteenth aspects, wherein the friction reducer is present in the wellbore servicing fluid in an amount of from about 0.0001 wt. % to about 3 wt. % based on a total weight of the wellbore servicing fluid.

An eighteenth aspect, which is the method of any of the first through the seventeenth aspects, wherein the aqueous fluid comprises fresh water, surface water, ground water, produced water, salt water, or combinations thereof.

A nineteenth aspect, which is the method of any of the first through the eighteenth aspects, wherein the aqueous fluid comprises a formulation water, a makeup water, a recycled water, a flow-back water, or combinations thereof.

A twentieth aspect, which is the method of any of the first through the nineteenth aspects, wherein the aqueous fluid is present in the wellbore servicing fluid in an amount of from about 50 wt. % to about 100 wt. % based on a total weight of the wellbore servicing fluid.

A twenty-first aspect, which is the method of any of the first through the twentieth aspects, wherein the wellbore servicing fluid further comprises proppants.

A twenty-second aspect, which is the method of the twenty-first aspect, wherein the proppants comprise sand, bauxite, ceramic materials, glass materials, polymer materials, polytetrafluoroethylene materials, nutshell pieces, cured resinous particulates including nutshell pieces, seed shell pieces, cured resinous particulates including seed shell pieces, fruit pit pieces, cured resinous particulates including fruit pit pieces, wood, composite particulates, or combinations thereof.

A twenty-third aspect, which is the method of any of the twenty-first and the twenty-second aspects, wherein the proppants are present in the wellbore servicing fluid in an amount of from about 0 pounds per gallon (lb/gal) to about 20 lb/gal, based on the total weight of the wellbore servicing fluid.

A twenty-fourth aspect, which is the method of any of the first through the twenty-third aspects, wherein the wellbore servicing fluid further comprises a gelling agent.

A twenty-fifth aspect, which is the method of the twenty-fourth aspect, wherein the gelling agent comprises locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly (acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

A twenty-sixth aspect, which is the method of any of the twenty-fourth and the twenty-fifth aspects, wherein the gelling agent has a molecular weight in a range of from about 1.2 MM Daltons (Da) to about 5 MM Da.

A twenty-seventh aspect, which is the method of any of the twenty-fourth through the twenty-sixth aspects, wherein the gelling agent is present in the wellbore servicing fluid in an amount of from about 0.001 wt. % to about 3 wt. %, based on the total weight of the wellbore servicing fluid.

A twenty-eighth aspect, which is the method of any of the first through the twenty-seventh aspects, wherein the wellbore servicing fluid further comprises one or more additives.

A twenty-ninth aspect, which is the method of the twenty-eighth aspect, wherein the one or more additives comprise a strength-stabilizing agent, an emulsifier, an expansion agent, a salt, a fluid loss agent, a vitrified shale, a thixotropic agent, a dispersing agent, a weight reducing additive, a heavy-weight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives, inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, crosslinking agents, weight-reducing agents, clay control agents, fluid loss control additives, flocculants, water softeners, foaming agents, oxidation inhibitors, thinners, scavengers, gas scavengers, lubricants, bridging agents, a foam stabilizer, catalysts, dispersants, breakers, emulsion thinner, emulsion thickener, pH control additive, lost circulation additives, buffers, crosslinkers, stabilizers, chelating agents, oxidizers, a clay, reducers, consolidating agent, complexing agent, sequestration agent, control agent, an oxidative breaker, and the like, or combinations thereof.

A thirtieth aspect, which is the method of any of the twenty-eighth and the twenty-ninth aspects, wherein the one or more additives are present in the wellbore servicing fluid in an amount of from about 0.01 GPT to about 5 GPT based on the total volume of the wellbore servicing fluid.

A thirty-first aspect, which is the method of any of the first through the thirtieth aspects, wherein the wellbore servicing fluid has a viscosity of from about 1 cP to about 50 cP.

A thirty-second aspect, which is the method of any of the first through the thirty-first aspects, wherein the wellbore servicing fluid has a density of from about 5 lb/gal to about 20 lb/gal.

A thirty-third aspect, which is the method of any of the first through the thirty-second aspects, wherein precipitates of friction reducers in the wellbore servicing fluid are in a range of from about 0 wt. % to about 5 wt. % based on a total weight of the wellbore servicing fluid.

A thirty-fourth aspect, which is the method of the thirty-third aspect, wherein the precipitates of friction reducers are generated from a reaction between iron ions and the friction reducer.

A thirty-fifth aspect, which is a method of preparing a wellbore servicing fluid, comprising: placing components of the wellbore servicing fluid into a container, wherein the wellbore servicing fluid comprises a friction reducer, an iron control agent, and an aqueous fluid, wherein the iron control agent comprises a compound according to Structure I, a salt of Structure I, or combinations thereof:

Structure I:

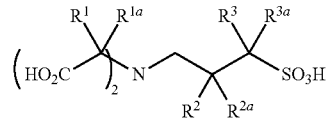

wherein $R^1$, $R^{1a}$, $R^2$, $R^{2a}$, $R^3$ and $R^{3a}$ are independently selected from a group consisting of H, —OH, halo, straight or branched $(C_1-C_6)$alkyl, straight or branched $(C_2-C_6)$ alkenyl, straight or branched $(C_2-C_6)$alkynyl, $(C_3-C_{14})$aryl, $(C_3-C_{14})$-cycloalkyl, $(C_3-C_{14})$aryl$(C_1-C_6)$alkylene-, $(C_3-C_{14})$heteroaryl-$(C_1-C_6)$alkylene-, $(C_3-C_{14})$heteroaryl, $(C_3-C_{14})$heterocycloalkyl, $(C_3-C_{14})$heterocycloalkyl-$(C_1-C_6)$alkylene-, $(C_3-C_{14})$heteroaryl-$(C_3-C_6)$heterocycloalkylene-, $(C_3-C_{14})$aryl-$(C_3-C_{14})$heterocycloalkylene-, $(C_3-C_{14})$-aryl-$(C_1-C_6)$alkyl-$(C_3-C_{14})$heterocycloalkylene-, $(C_3-C_{14})$heteroaryl-$(C_1-C_6)$alkyl-$(C_3-C_{14})$heterocycloalkylene-, $(C_3-C_{14})$heterocycloalkyl-$(C_1-C_6)$alkyl-$(C_3-C_{14})$ heterocycloalkylene-; and blending the components of the wellbore servicing fluid to form a pumpable fluid.

A thirty-sixth aspect, which is the method of the thirty-fifth aspect, wherein the wellbore servicing fluid further comprises a proppant.

A thirty-seventh aspect, which is the method of the thirty-fifth or the thirty-sixth aspect, further comprising placing the wellbore servicing fluid in a wellbore, wherein the wellbore servicing fluid contacts an aqueous formation fluid comprising iron ions.

A thirty-eighth aspect, which is the method of any of the first through the thirty-fourth aspects and the thirty-seventh aspect, wherein placing the wellbore servicing fluid into the wellbore is at or above a pressure sufficient to create or enhance at least one fracture in the subterranean formation.

A thirty-ninth aspect, which is the method of the thirty-eighth aspect, further comprising depositing at least one proppant in the at least one fracture.

A fortieth aspect, which is a method of servicing a wellbore penetrating at least a portion of a subterranean formation, comprising: placing a solid-free fracturing fluid into the wellbore at an injection rate for generating a treating pressure above a fracture gradient to create one or more fractures in the subterranean formation, wherein the solid-free fracturing fluid comprises a friction reducer, an iron control agent, and an aqueous fluid, wherein the iron control agent comprises a compound according to Structure I, a salt of Structure I, or combinations thereof:
Structure I:

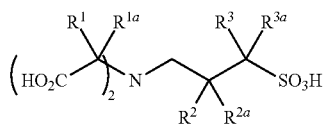

wherein $R^1$, $R^{1a}$, $R^2$, $R^{2a}$, $R^3$ and $R^{3a}$ are independently selected from a group consisting of H, —OH, halo, straight or branched $(C_1-C_6)$alkyl, straight or branched $(C_2-C_6)$alkenyl, straight or branched $(C_2-C_6)$alkynyl, $(C_3-C_{14})$aryl, $(C_3-C_{14})$-cycloalkyl, $(C_3-C_{14})$aryl$(C_1-C_6)$alkylene-, $(C_3-C_{14})$heteroaryl-$(C_1-C_6)$alkylene-, $(C_3-C_{14})$heteroaryl, $(C_3-C_{14})$heterocycloalkyl, $(C_3-C_{14})$heterocycloalkyl-$(C_1-C_6)$alkylene-, $(C_3-C_{14})$heteroaryl-$(C_3-C_6)$heterocycloalkylene-, $(C_3-C_{14})$aryl-$(C_3-C_{14})$heterocycloalkylene-, $(C_3-C_{14})$-aryl-$(C_1-C_6)$alkyl-$(C_3-C_{14})$heterocycloalkylene-, $(C_3-C_{14})$heteroaryl-$(C_1-C_6)$alkyl-$(C_3-C_{14})$heterocycloalkylene-, $(C_3-C_{14})$heterocycloalkyl-$(C_1-C_6)$alkyl-$(C_3-C_{14})$heterocycloalkylene-; and placing a mixture of the solid-free fracturing fluid and proppants into the wellbore to place at least one proppant into the one or more fractures.

A forty-first aspect, which is the method of the fortieth aspect, wherein the subterranean formation comprises a formation brine.

A forty-second aspect, which is the method of the forty-first aspect, wherein the aqueous fluid, the formation brine, or both comprise iron ions.

A forty-third aspect, which is the method of the forty-second aspect, wherein the friction reducer comprises an acrylamide polymer or copolymer.

A forty-fourth aspect, which is the method of the forty-third aspect, wherein the friction reducer is anionic.

While aspects of the disclosure have been shown and described, modifications thereof can be made by one skilled in the art without departing from the spirit and teachings of the disclosure. The aspects described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both aspects with this feature and aspects without this feature are disclosed. Similarly, the present disclosure contemplates aspects where this feature is required and aspects where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present disclosure.

What is claimed is:

1. A method of servicing a wellbore penetrating at least a portion of a subterranean formation, comprising: placing a wellbore servicing fluid into a wellbore, wherein the wellbore servicing fluid comprises a friction reducer, an iron control agent, and an aqueous fluid, wherein the iron control agent comprises a compound according to Structure I, a salt of Structure I, or combinations thereof:
Structure I:

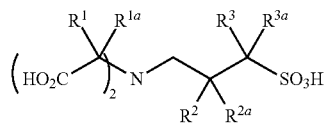

wherein $R^1$, $R^{1a}$, $R^2$, $R^{2a}$, $R^3$ and $R^{3a}$ are independently selected from a group consisting of H, —OH, halo, straight or branched $(C_1-C_6)$alkyl, straight or branched $(C_2-C_6)$alkenyl, straight or branched $(C_2-C_6)$alkynyl, $(C_3-C_{14})$aryl, $(C_3-C_{14})$-cycloalkyl, $(C_3-C_{14})$aryl$(C_1-C_6)$alkylene-, $(C_3-C_{14})$heteroaryl-$(C_1-C_6)$alkylene-, $(C_3-C_{14})$heteroaryl, $(C_3-C_{14})$heterocycloalkyl, $(C_3-C_{14})$heterocycloalkyl-$(C_1-C_6)$alkylene-, $(C_3-C_{14})$heteroaryl-$(C_3-C_6)$heterocycloalkylene-, $(C_3-C_{14})$aryl-$(C_3-C_{14})$heterocycloalkylene-, $(C_3-C_{14})$-aryl-$(C_1-C_6)$alkyl-$(C_3-C_{14})$heterocycloalkylene-, $(C_3-C_{14})$heteroaryl-$(C_1-C_6)$alkyl-$(C_3-C_{14})$heterocycloalkylene-, $(C_3-C_{14})$heterocycloalkyl-$(C_1-C_6)$alkyl-$(C_3-C_{14})$heterocycloalkylene-.

2. The method of claim 1, wherein the subterranean formation comprises a formation brine.

3. The method of claim 2, wherein at least one of the aqueous fluid, the formation brine, and the subterranean formation comprise iron.

4. The method of claim 3, wherein the iron comprises iron ions.

5. The method of claim 4, wherein the iron ions are present in at least one of the aqueous fluid and the formation brine in an amount of from about 20 ppm to about 13,000 ppm.

6. The method of claim 4, wherein the iron control agent reacts with at least a portion of the iron ions.

7. The method of claim 4, wherein a molar ratio of the iron control agent to the iron ions present in a total of the wellbore servicing fluid and the formation brine is from about 1:5 to about 2:1.

8. The method of claim 1, wherein the iron control agent comprises N,N-diacetylhomotaurine.

9. The method of claim 1, wherein the iron control agent is present in the wellbore servicing fluid in an amount of from about 5.0E-2 mmol/L to about 100 mmol/L, based on the total volume of the wellbore servicing fluid.

10. The method of claim 1, wherein the friction reducer comprises an anionic friction reducer, a cationic friction reducer, a nonionic friction reducer, an amphoteric friction reducer, or combinations thereof.

11. The method of claim 1, wherein the friction reducer comprises a polyacrylamide, a polyacrylamide derivative, a synthetic polymer, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, polymers synthesized from one or more monomeric units selected from the group consisting of acrylamide, acrylic acid, 2-acrylamido-2-methylpropane sulfonic acid, acrylamido tertiary butyl sulfonic acid, N,N-dimethylacrylamide, vinyl sulfonic acid, N-vinyl acetamide, N-vinyl formamide, itaconic acid, methacrylic acid, acrylic acid esters, methacrylic acid esters, their corresponding salts, and their corresponding esters, or combinations thereof.

12. The method of claim 1, wherein the friction reducer is present in the wellbore servicing fluid in an amount of from about 0.0001 wt. % to about 3 wt. % based on a total weight of the wellbore servicing fluid.

13. The method of claim 1, wherein the aqueous fluid is present in the wellbore servicing fluid in an amount of from about 50 wt. % to about 100 wt. % based on a total weight of the wellbore servicing fluid.

14. The method of claim 1, wherein the wellbore servicing fluid further comprises proppants.

15. The method of claim 14, wherein the proppants are present in the wellbore servicing fluid in an amount of from about 0 pounds per gallon (lb/gal) to about 20 lb/gal, based on the total weight of the wellbore servicing fluid.

16. The method of claim 1, wherein placing the wellbore servicing fluid into the wellbore is at or above a pressure sufficient to create or enhance at least one fracture in the subterranean formation.

17. The method of claim 16, further comprising depositing at least one proppant in the at least one fracture.

18. A method of servicing a wellbore penetrating at least a portion of a subterranean formation, comprising: placing a solid-free fracturing fluid into the wellbore at an injection rate for generating a treating pressure above a fracture gradient to create one or more fractures in the subterranean formation, wherein the solid-free fracturing fluid comprises a friction reducer, an iron control agent, and an aqueous fluid, wherein the iron control agent comprises a compound according to Structure I, a salt of Structure I, or combinations thereof:

Structure I:

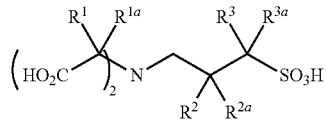

wherein $R^1$, $R^{1a}$, $R^2$, $R^{2a}$, $R^3$ and $R^{3a}$ are independently selected from a group consisting of H, —OH, halo, straight or branched ($C_1$-$C_6$)alkyl, straight or branched ($C_2$-$C_6$)alkenyl, straight or branched ($C_2$-$C_6$)alkynyl, ($C_3$-$C_{14}$)aryl, ($C_3$-$C_{14}$)-cycloalkyl, ($C_3$-$C_{14}$)aryl($C_1$-$C_6$)alkylene-, ($C_3$-$C_{14}$)heteroaryl-($C_1$-$C_6$)alkylene-, ($C_3$-$C_{14}$)heteroaryl, ($C_3$-$C_{14}$)heterocycloalkyl, ($C_3$-$C_{14}$)heterocycloalkyl-($C_1$-$C_6$)alkylene-, ($C_3$-$C_{14}$)heteroaryl-($C_3$-$C_6$)heterocycloalkylene-, ($C_3$-$C_{14}$)aryl-($C_3$-$C_{14}$)heterocycloalkylene-, ($C_3$-$C_{14}$)-aryl-($C_1$-$C_6$)alkyl-($C_3$-$C_{14}$)heterocycloalkylene-, ($C_3$-$C_{14}$)heteroaryl-($C_1$-$C_6$)alkyl-($C_3$-$C_{14}$)heterocycloalkylene-, ($C_3$-$C_{14}$)heterocycloalkyl-($C_1$-$C_6$)alkyl-($C_3$-$C_{14}$)heterocycloalkylene-; and placing a mixture of the solid-free fracturing fluid and proppants into the wellbore to place at least one proppant into the one or more fractures.

19. The method of claim 18, wherein the subterranean formation comprises a formation brine.

20. The method of claim 19, wherein the aqueous fluid, the formation brine, or both comprise iron ions.

* * * * *